(12) United States Patent
Legare et al.

(10) Patent No.: US 7,682,131 B2
(45) Date of Patent: Mar. 23, 2010

(54) IMPELLER BAFFLE WITH AIR CAVITY DESWIRLERS

(75) Inventors: Pierre-Yves Legare, Chambly (CA); Jason Todd Herborth, Acton (CA); Glen Owen Arthur, Etobicoke (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 647 days.

(21) Appl. No.: 11/536,181

(22) Filed: Sep. 28, 2006

(65) Prior Publication Data
US 2008/0080969 A1  Apr. 3, 2008

(51) Int. Cl.
F04D 29/44 (2006.01)

(52) U.S. Cl. .................. 415/208.2; 415/211.2

(58) Field of Classification Search .......... 415/106, 415/208.2, 208.4, 211.2; 417/423.11, 423.12
See application file for complete search history.

(56) References Cited

U.S. PATENT DOCUMENTS

| | | | |
|---|---|---|---|
| 5,601,406 A * | 2/1997 | Chan et al. ............. | 415/206 |
| 5,862,666 A | 1/1999 | Liu | |
| 6,276,896 B1 * | 8/2001 | Burge et al. ............ | 415/115 |
| 7,287,384 B2 * | 10/2007 | Fish et al. .............. | 60/782 |
| 2005/0132706 A1 | 6/2005 | Fukutani et al. | |
| 2006/0123795 A1 | 6/2006 | Fish et al. | |
| 2008/0193277 A1 * | 8/2008 | Legare ................. | 415/106 |

OTHER PUBLICATIONS

International Search Report dated Jan. 28, 2008 on Applicant's corresponding PCT International Appplication No. PCT/CA2007/001713.

* cited by examiner

Primary Examiner—Edward Look
Assistant Examiner—Ryan H Ellis
(74) Attorney, Agent, or Firm—Ogilvy Renault LLP

(57) ABSTRACT

A gas turbine engine includes a high-pressure compressor having an impeller and an impeller baffle having a generally annular body, the impeller baffle spaced apart from a back face of an impeller to create an airspace therebetween, the airspace communicating between an impeller exit and an apparatus to be pressurized, the impeller baffle including a plurality of generally radially-disposed ribs extending into the airspace for diminishing the velocity of air swirling in the airspace.

12 Claims, 3 Drawing Sheets

IMPELLER BAFFLE WITH AIR CAVITY DESWIRLERS

TECHNICAL FIELD

The invention relates generally to gas turbine engines and, more particularly, to impeller baffles of gas turbine engines.

BACKGROUND OF THE ART

A gas turbine high-pressure compressor may include a centrifugal impeller. At the compressor exit and immediately behind (downstream of) the centrigual impeller the compressed air, also known as the "impeller backface air" may be used to pressurize an engine air system, referred to herein as the P3 Bleed Air System, as well as pressurizing nearby air-oil interfaces, such as those sealing adjacent bearing cavities. To drive such a system, sufficient pressures must be maintained in the impeller back face air.

An impeller baffle can be disposed downstream of the impeller backface can act as a diffuser, slowing the impeller backface air to locally increase the air pressure. However, despite the presence of an impeller baffle, the pressure at the impeller backface (and particularly at the tip of the impeller baffle) can still sometimes be too low.

Accordingly, there is a need to provide an improved design to address this potential susceptibility.

SUMMARY OF THE INVENTION

It is therefore an object of this invention to provide an improved impeller baffle.

In one aspect, the present invention provides a gas turbine engine comprising a low-pressure compressor and a low-pressure turbine rotationally mounted on a first axial shaft, and a high-pressure compressor and a high-pressure turbine together defining a high-pressure spool rotationally mounted on a second shaft coaxial with the first shaft, the high-pressure compressor having an impeller for pressurizing air in the engine, the high-pressure compressor and the high-pressure turbine being rotationally supported by a high-pressure spool bearing disposed between the impeller and the high-pressure turbine. The gas turbine engine also includes a carbon seal disposed at the front of a bearing housing that houses the bearing to prevent oil from leaking from the bearing housing. The gas turbine engine further includes an impeller baffle having a generally annular body, the impeller baffle including a front face having a plurality of ribs for diminishing the velocity of air swirling behind an impeller backface to thereby increase air pressure to improve the efficacy of the carbon seal to thus prevent bearing oil leak.

In another aspect, the present invention provides an impeller baffle for deswirling air downstream of an impeller in a gas turbine engine. The impeller baffle includes a generally annular body and a plurality of ribs formed on a front face of the annular body of the baffle, the ribs adapted to deswirl the air behind an impeller backface to thereby increase air pressure to improve the efficacy of the carbon seal to thus prevent bearing oil leak.

In another aspect, the present invention provides a method of installing an impeller baffle in a gas turbine engine. The method includes steps of press fitting an impeller baffle to a bearing housing of a bearing that rotationally supports a high-pressure spool of the engine, the impeller baffle having a plurality of ribs on a front face of the baffle for deswirling the air downstream of an impeller to thereby increase air pressure to improve the efficacy of the carbon seal to thus prevent bearing oil leak. The method also includes a step of affixing a retaining ring to further secure the impeller baffle to the bearing housing.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
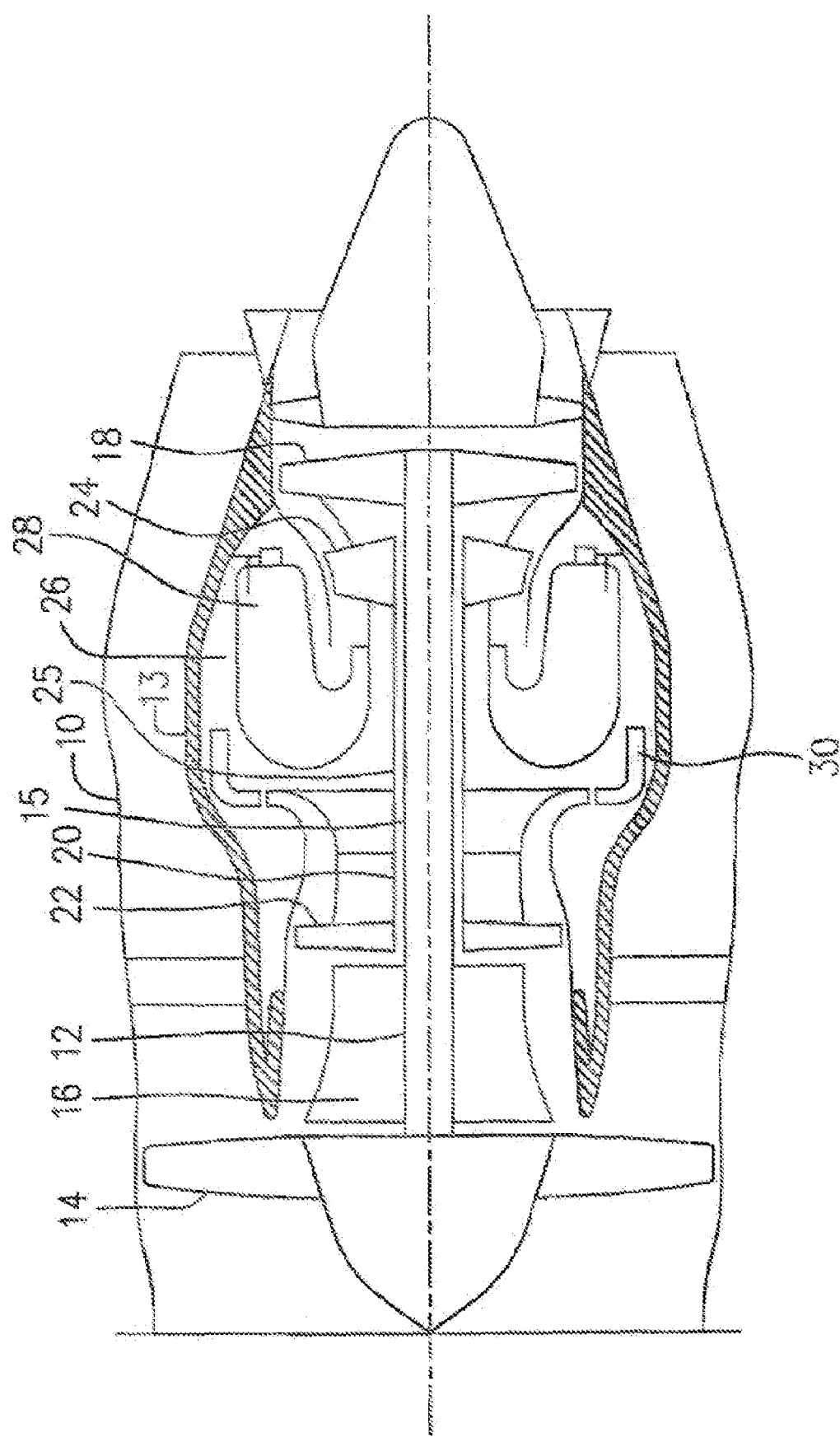
FIG. 1 is a schematic cross-sectional view of a turbofan as an example of a gas turbine engine that could incorporate embodiments of the present invention.

Referring to FIG. 1, a turbofan gas turbine engine incorporating an embodiment of the present invention is presented as an example of the application of the present invention, and includes a housing 10, a core casing 13, a low pressure spool assembly seen generally at 12 which includes a shaft 15 interconnecting a fan assembly 14, a low pressure compressor 16 and a low pressure turbine assembly 18, and a high pressure spool assembly seen generally at 20 which includes a shaft at 25 interconnecting a high pressure compressor assembly 22 and a high pressure turbine assembly 24. The core casing 13 surrounds the low and high pressure spool assemblies 12 and 20 in order to define a main fluid path (not indicated) therethrough. In the main fluid path there are provided a combustion section 26 having a combustor 28 therein. Pressurized air provided by the high pressure compressor assembly 22 through a diffuser 30 enters the combustion section 26 for combustion taking place in the combustor 28.

Figure 2:
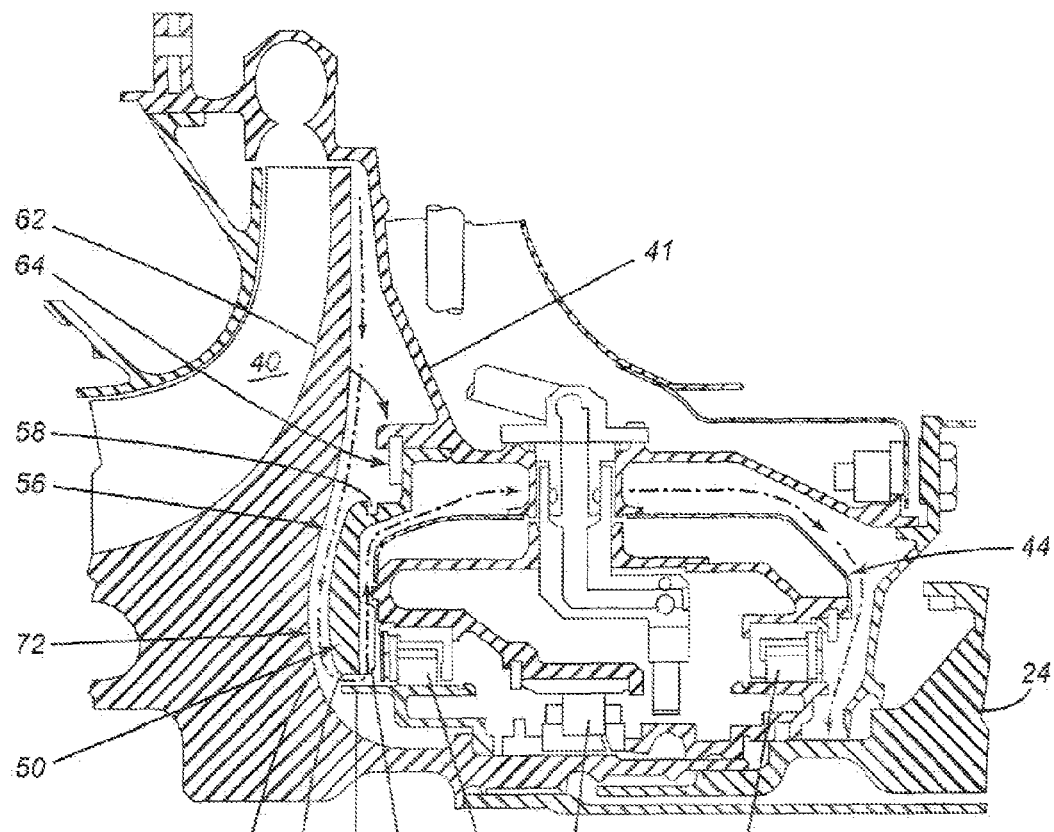
FIG. 2 is an enlarged cross-sectional view of the bearing housing and surrounding structure, showing the airflow through the bearing housing due to the restriction caused by the impeller baffle.

FIG. 2 shows, in cross section, an upper portion of the high-pressure spool assembly 20 of a turbofan such as the one shown in FIG. 1. The high-pressure spool assembly 20 (also referred to herein as simply the "high-pressure spool") includes the high-pressure compressor and the high-pressure turbine section which are both rotationally mounted on bearings to a common shaft. The high-pressure compressor includes multiple axial stage rotors followed by a centrifugal impeller 40 shown in FIG. 2, having a coverplate 41. The compressor supplies pressurized air to the combustor 28, the hot gases from which drive the high-pressure turbine assembly 24 as well as the low-pressure turbine assembly (not shown in this figure).

As shown in FIG. 2, the impeller has a backface 42 behind which the air swirls at high velocity due to the rotation of the impeller. This swirling, high-velocity air tends to lower the pressure of the "backface air", i.e. the air immediately behind (i.e. downstream of) the impeller backface 42.

As further shown in FIG. 2, within a bearing housing 44 is a bearing 46, i.e., a high-pressure spool bearing, which rotationally supports the high-pressure spool (that is, the high-pressure compressor and the high-pressure turbine). The high-pressure spool bearing 46 is lubricated and cooled with oil circulated by a lubrication system within the gas turbine engine. A front carbon seal 48 (as well as a rear carbon seal 49) are mounted to the bearing housing 44 to ensure that oil is sealed within the bearing housing. The front carbon seal 48, which is a controlled-gap seal, is pressurized to prevent oil from leaking out of the bearing housing.

To improve pressurization, an impeller baffle is mounted to the coverplate 41/bearing housing 44 for deswirling the air (i.e., slowing the air). Reducing the velocity of the swirling air increases the air pressure at the backface of the impeller, which thus increases the pressurization of carbon seal 48 immediately in front of the bearing 46. Thus, the front carbon seal 48 is further aided in sealing the bearing 46.

Figure 3:
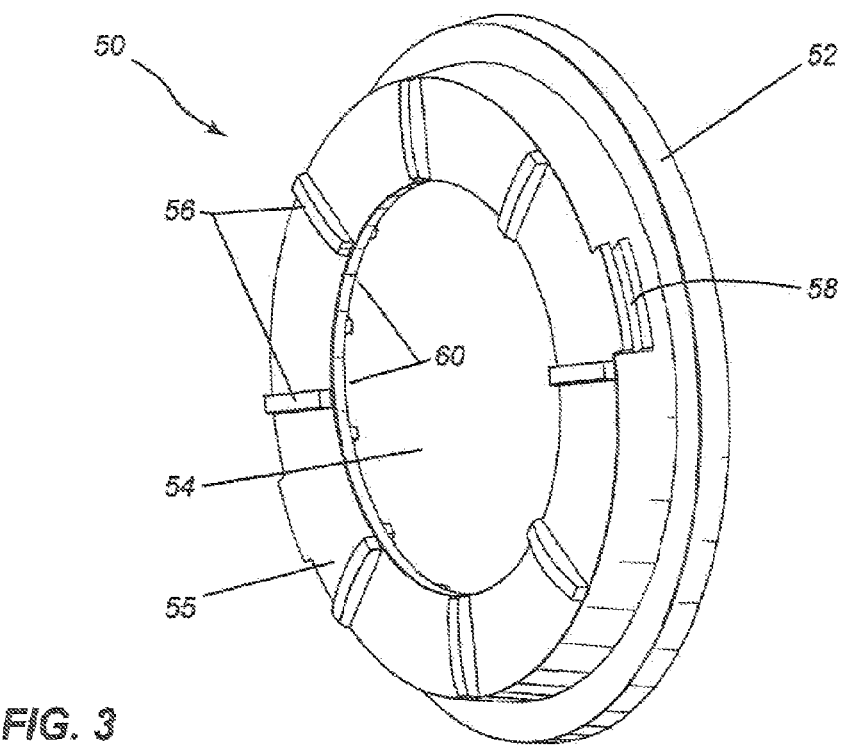
FIG. 3 is a front isometric perspective view of the impeller baffle in accordance with an embodiment of the present invention.
Figure 4:
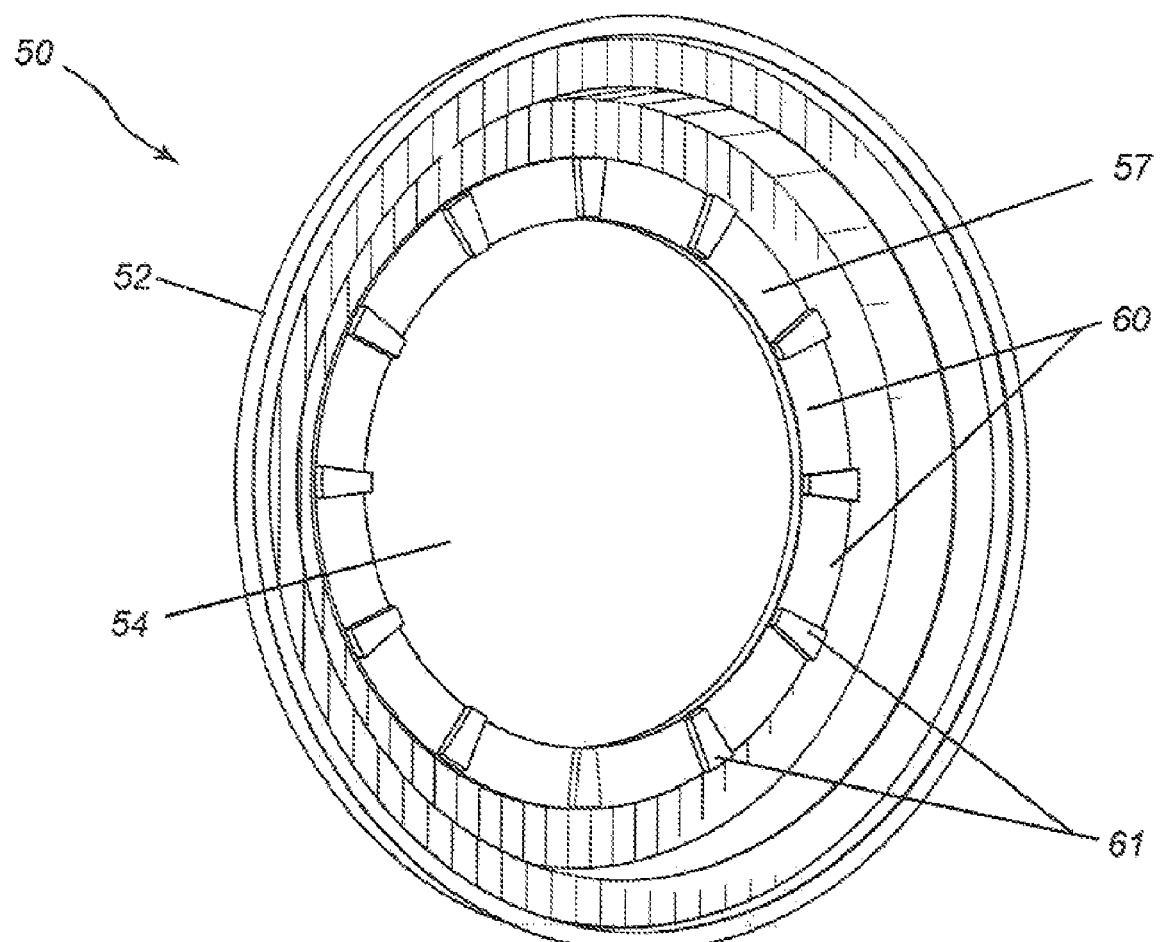
FIG. 4 is a rear isometric perspective view of the impeller baffle shown in FIG. 3.

In accordance with an embodiment of the present invention, an improved impeller baffle 50, which is illustrated in FIGS. 2-4, has deswirling elements that deswirl the air (i.e., interfere with the swirling of the air to slow the air and thus increase its pressure to thereby pressurize he front carbon seal 48). The improved impeller baffle 50 is mounted to a forward-facing portion of the bearing housing 44 as shown in FIG. 2.

As shown in FIGS. 3-4, the improved impeller baffle 50 has a generally annular body (not numbered) having a central opening 54 therethrough. As shown in FIG. 3, the impeller baffle 50 has a front face 55 upon which are formed a plurality of ribs 56 (also known as "deswirling ribs" or "standoff ribs") which interfere with the swirling of the air to diminish the air velocity behind an impeller backface to thereby increase air pressure to enhance the sealing efficacy of the front carbon seal 48 to thus guard oil within the bearing housing 44.

In one embodiment, the ribs 56 extend radially from the central opening 54 of the baffle toward an outer periphery of the baffle, The ribs preferably have a curved profile matching a contour of the impeller backface as best shown in FIG. 2.

In the particular embodiment shown in FIG. 3, there are 8 radial ribs formed on the front face of the baffle and these are equidistantly spaced so that each rib and its immediate neighbour form an angle of 45 degrees. However, the number of ribs and their exact arrangement on the front face of the baffle can be varied. Likewise, the profile of the ribs can be varied from what is shown in the figures.

As further illustrated in FIG. 3, the impeller baffle 50 can include puller grooves 58 formed in a lateral (or peripheral) surface of the baffle to facilitate removal of the impeller baffle (after it has been installed into a tightly fitting position against the bearing housing). Installation and removal of the impeller baffle will be described in greater detail below, with reference to FIG. 2.

FIG. 4 shows a rear isometric perspective view of the impeller baffle 50 of FIG. 3. In this embodiment, the impeller baffle 50 includes a plurality of air slots 60 on a rear face 57 of the baffle which further deswirl the air and thus further increase the pressure of the air at the carbon seal. In the particular embodiment shown in FIG. 4, there are 12 slots although the number of air slots can of course be varied. Likewise, FIG. 4 shows that, in this particular embodiment, the air slots 60 are formed by a plurality of small wedges or lobes 61 that extend radially from the central opening 54 and are each spaced 22.5 degrees from the immediately neighboring wedge-shaped lobe. The number, shape, and configuration of these air slots can be varied to suit the desired airflow characteristics behind the baffle.

FIG. 2 shows how the impeller baffle 50 is mounted to the bearing housing 44. The impeller baffle 50 has a lateral (peripheral) surface that defines a lip 52 that forms a tight fit (or press fit) with the bearing housing 44 which secures the impeller baffle in place. The impeller baffle is further secured to the bearing housing 44 by a retaining ring 64.

As further illustrated in FIG. 2, the inner surface 59 of the annular body of the baffle extends radially inwardly into close proximity with an outer surface of a runner 70 supporting the carbon seal 48 to thus define a narrow air gap 72 that functions as a restrictor to restrict airflow over the rear face of the baffle. The airflow path is shown in FIG. 2 by the dashed line.

A method of installing the impeller baffle in a gas turbine engine includes steps of press fitting the impeller baffle to the bearing housing and then affixing the retaining ring to further secure the impeller baffle to the bearing housing. To disassemble or remove the impeller baffle, the retaining ring is first removed and then the baffle is extracted from its tight fit by hooking a tool into the puller grooves and then pulling the baffle off the housing. When installing the baffle, the puller grooves should be aligned to provide maximum access to facilitate disassembly.

The impeller baffle can be machined from stainless steel bar stock although other metals having equivalent or similar mechanical and thermal properties could be substituted. The impeller baffle should have a thickness that is sufficiently large so that the natural frequency of the baffle is outside of any running range.

The above description is meant to be exemplary only, and one skilled in the art will recognize that changes may be made to the embodiments described without departing from the scope of the invention disclosed. For example, the impeller baffle can be used not only for turbofans or turbojets, but also for turboprops, turboshafts or any other gas turbine engine. In the described embodiment, improved pressurization of impeller back face air for sealing air-oil interfaces is desired, though the apparatus of the present invention may be used for any suitable purpose. Still other modifications which fall within the scope of the present invention will be apparent to those skilled in the art, in light of a review of this disclosure, and such modifications are intended to fall within the appended claims.

The invention claimed is:

1. A gas turbine engine comprising:
a high-pressure compressor having an impeller; and
an impeller baffle having a generally annular body, the impeller baffle spaced apart from a back face of an impeller to create an airspace therebetween, the airspace communicating between an impeller exit and an apparatus to be pressurized, the impeller baffle including a plurality of generally radially-disposed ribs extending into the airspace for diminishing the velocity of air swirling in the airspace, and further including a plurality of air slots disposed on a rear face of the impeller baffle for further reducing air swirl.

2. The gas turbine engine as defined in claim 1 wherein the ribs extend radially from a central opening of the baffle and have a curved profile matching a contour of the impeller backface.

3. The gas turbine engine as defined in claim 2 wherein the annular body of the impeller baffle extends radially into close proximity with an outer surface of a runner supporting a carbon seal to thus define a narrow air gap that functions as a restrictor to restrict airflow over the rear face of the baffle.

4. The gas turbine engine as defined in claim 1 wherein the annular body of the impeller baffle extends radially into close proximity with an outer surface of a runner supporting a carbon seal to thus define a narrow air gap that functions as a restrictor to restrict airflow over the rear face of the baffle.

5. The gas turbine engine as defined in claim 1 wherein the impeller baffle further comprises a plurality of puller grooves formed in a lateral surface of the baffle to facilitate removal of the impeller baffle.

6. The gas turbine engine as defined in claim 1 wherein a lateral surface of the impeller baffle forms a tight fit with the bearing housing to secure the impeller baffle and wherein the impeller baffle is further secured by a retaining ring.

7. An impeller baffle for deswirling air downstream of an impeller in a gas turbine engine, the impeller baffle comprising:
- a generally annular body;
- a plurality of ribs formed on a front face of the annular body of the baffle, the ribs adapted to deswirl the air behind an impeller backface; and
- a plurality of air slots disposed on a rear face of the impeller baffle for further curtailing air swirl and thus further increasing air pressure.

8. The impeller baffle as defined in claim 7 wherein the ribs extend radially from a central opening of the baffle and have a curved profile matching a contour of the impeller backface.

9. The impeller baffle as defined in claim 8 wherein the annular body of the impeller baffle extends radially into close proximity with an outer surface of a runner supporting a carbon seal to thus define a narrow air gap that functions as a restrictor to restrict airflow over the rear face of the baffle.

10. The impeller baffle as defined in claim 7 wherein the annular body of the impeller baffle extends radially into close proximity with an outer surface of a runner supporting a carbon seal to thus define a narrow air gap that functions as a restrictor to restrict airflow aver the rear face of the baffle.

11. The impeller baffle as defined in claim 7 wherein the impeller baffle further comprises a plurality of puller grooves formed in a lateral surface of the baffle to facilitate removal of the impeller baffle.

12. The impeller baffle as defined in claim 7 wherein a lateral surface of the impeller baffle forms a tight fit with the bearing housing to secure the impeller baffle and wherein the impeller baffle is further secured by a retaining ring.

* * * * *